(12) United States Patent
Calleri

(10) Patent No.: US 7,642,474 B2
(45) Date of Patent: Jan. 5, 2010

(54) DEVICE FOR THE QUANTITATIVE ANALYSIS OF DEBRIS

(75) Inventor: Antonio Calleri, Milan (IT)

(73) Assignee: Geolog S.p.A., Potenza (IT)

( * ) Notice: Subject to any disclaimer, the term of this patent is extended or adjusted under 35 U.S.C. 154(b) by 158 days.

(21) Appl. No.: 12/067,133

(22) PCT Filed: Sep. 11, 2006

(86) PCT No.: PCT/EP2006/008814
§ 371 (c)(1),
(2), (4) Date: Mar. 17, 2008

(87) PCT Pub. No.: WO2007/039038
PCT Pub. Date: Apr. 12, 2007

(65) Prior Publication Data
US 2008/0250853 A1    Oct. 16, 2008

(30) Foreign Application Priority Data
Sep. 22, 2005   (IT) .............................. MI05A1771

(51) Int. Cl.
*G01G 19/40* (2006.01)
*E21B 21/08* (2006.01)
(52) U.S. Cl. .................... 177/16; 177/145; 73/152.19; 73/152.21
(58) Field of Classification Search .............. 73/152.19, 73/152.21, 152.43; 177/119–122, 145, 16, 177/17
See application file for complete search history.

(56) References Cited

U.S. PATENT DOCUMENTS

| | | | |
|---|---|---|---|
| 2,993,625 A | | 7/1961 | Esval |
| 4,463,816 A | * | 8/1984 | MacFarlane ................. 177/119 |
| 4,615,403 A | * | 10/1986 | Nakamura ................ 177/25.18 |
| 4,682,664 A | * | 7/1987 | Kemp ........................... 177/16 |
| 4,696,357 A | * | 9/1987 | Beehler et al. .............. 177/145 |
| 4,708,215 A | * | 11/1987 | Nakamura et al. ........ 177/25.18 |
| 4,821,820 A | * | 4/1989 | Edwards et al. ........... 177/25.18 |
| 5,111,896 A | * | 5/1992 | Porcari et al. .................. 177/16 |
| 5,285,019 A | * | 2/1994 | Kempf et al. .................. 177/16 |
| 5,880,407 A | * | 3/1999 | Flammang ................... 177/116 |
| 6,386,026 B1 | | 5/2002 | Zamfes |
| 6,410,862 B1 | * | 6/2002 | Lecann ......................... 177/17 |
| 6,683,262 B2 | * | 1/2004 | Scott .......................... 177/145 |
| 2002/0033278 A1 | | 3/2002 | Reddoch |
| 2002/0157878 A1 | * | 10/2002 | Scott .......................... 177/145 |

* cited by examiner

*Primary Examiner*—Randy W Gibson
(74) *Attorney, Agent, or Firm*—Weiner & Bart, P.C.; Irving M. Weiner; Pamela S. Burt

(57) ABSTRACT

Device for the quantitative analysis of debris (12, 41) preferably produced during drilling, of the type equipped with means for the progressive collection of the debris, means for the progressive weighing of the debris collected, means for periodical discharging of the same and a structure for support of the device, wherein said means for the collection of the debris comprise a conveyor belt (22, 46) wound in the manner of a track on at least two rollers (23, 24), said means for weighing the debris comprise at least four sensing elements (214, 411) placed so as to take a direct measurement of the weight force exerted on the conveyor belt (22, 46) and said means for discharging debris comprise the unit for actuation of the rollers.

20 Claims, 4 Drawing Sheets

DEVICE FOR THE QUANTITATIVE ANALYSIS OF DEBRIS

The present invention relates to the equipment used on oil drilling sites and more specifically a device for the quantitative analysis of the debris produced during the drilling of a well.

It is known that localisation of an oilfield may take place through a series of geological and geophysical surveys. Drilling of the soil, whether under the sea or on dry land, is mainly carried out with the rotary system, that is to say through the use of a rotating drill bit screwed to the end of a progressive series of drilling rods.

A recent development in oil drilling is that of building deviated wells which do not follow a path perpendicular to the drilled surface but develop at a depth, almost horizontally, through a progressive curvature of the rods in order to traverse the layers also in their horizontal dimension. These drilling operations, that can exceed 35000 linear feet, subject the augers to much higher torsional torque levels compared to those measured during vertical drilling operations. It is therefore of the utmost importance to adjust in real time the working parameters of the drilling such as the friction of the well, the rheology and flow of the drilling fluid, the speed of rotation of the auger and the speed of penetration of the auger.

It is important to have constant knowledge of the thrust force of the formations traversed in order to be able to contrast, by constant feeding into the well of a drilling fluid of appropriate density, the sudden further rise of hydrocarbons or of the gas mixture. It is equally vital to check the geometry of the excavated well and the behaviour of the rock walls that define the internal surface of the well. The drilling fluid performs an essential role: as already mentioned it contrasts the pressure of the hydrocarbons but above all it serves to transport continuously outside of the well all the debris produced during drilling in order to keep the well as clean as possible. An accumulation of debris in the gap between the auger and well walls in fact causes a hazardous increase in the resistance torque and in some cases leads to the blockage and breakage of the actual auger. An incident of this type is economically disastrous and may jeopardise the outcome of the drilling. Theoretically, during a drilling operation, a volume of debris $v(t)$ is produced, exactly equal to the variation of the volume V of the well in the unit of time:

$$\frac{dV}{dt} = S(t) \cdot dl = v(t)$$

this means that, instantaneously, all the material excavated by the auger should come out of the mouth of the well. In practice the relationship that experts are called on to analyse is more complicated and can be expressed in a simplified way as follows:

$$\frac{dV}{dt} = \vec{S}(\vec{x}, t) \times d\vec{x}(t)dt + Q(\vec{x}', t + \tau_1) = v(t + \tau_2)$$

in which, from left to right, the necessary interpretation is that the variation of the volume of the well at a certain instant and at a certain depth equals the area of the section of the well at the same depth and at the same instant multiplied by the advance of the auger in the infinitesimal time interval dt, added to a source term Q which we will discuss herein below.

This variation in volume can be detected at the mouth of the well by measuring the volume of the debris transported by the drilling fluid with a certain delay in relation to the instant t. This delay is due to the speed of circulation of the fluid which has to transport the debris as far as the mouth of the well and to its rheological properties.

The source term Q is particularly interesting: when it is negative, it means that a hazardous accumulation of debris is probably forming in the well and there is the risk of breakage of the auger. If instead this term is positive, it means that there has probably been a landslide inside the well and therefore the walls are instable. Obviously the accumulation or the landslide may take place at any depth during drilling.

The qualitative and quantitative analysis of the flow of debris in real time therefore allows a person skilled in the art to formulate realistic hypotheses as to possible instability of the walls or an accumulation of debris, and to take the appropriate measures to avoid technical accidents. This type of analysis is much more important in deviated drilling operations as the well is very long and the problems of stability and cleanliness of the hole are accentuated.

The qualitative analysis of the debris is committed to the work of the geologists and is aimed at gaining knowledge of the exact composition and density of the crumbled rock and allows a measurement of the weight of the debris to be converted into a measurement of their volume. The quantitative analysis, that is to say the measurement of the weight of the debris, is an operation of primary importance assigned to specific machines that have to work full time and are located at the "well mouths". Having reached the surface the drilling fluid, which carries with it the debris, traverses special vibrating screens that separate the liquid part from the solid part. The former is reintegrated in the recirculation of the fluid while the latter is conveyed onto apparatuses for weighing.

Among the various solutions proposed by the market the most important is probably that described in the document EP 0995009 and relates to a device for measuring the flow of debris of a drilling operation brought to the surface by drilling fluid, equipped with means for collecting the debris and means for constant measurement of their weight. The means for collecting the debris comprise a receptacle in the form of a tray rotating on one axis, means for tilting said tray in order to empty it and means for controlling said means for tilting the tray comprising a chronometer used to determine the time during which the tray remains in the position of collection of the debris. The means for constant measurement of the weight of the debris comprise a measurement cell connected to said means for tilting the tray, designed to measure a force that is substantially proportional to the weight of the debris collected.

This device allows the collection of debris for a time set by the user and the logic of processing of the data allows, via known operations, a cumulative estimate to be achieved of the volume of the debris collected as a function of the time and of the depth of penetration, and also allows the calculated well profile to be mapped.

Despite the advantage of the considerable amount of information that can be obtained with this device in relation to the weighing of the debris performed with the traditional systems, there are still some limitations on the precision of the weighing and on the flexibility of use of the aforementioned device inherent in the physics of the same.

The measurement cell is in fact positioned so as to measure the bending moment of the tray in relation to its axis of rotation and therefore the measurement of weight of the debris is affected by systematic imprecision due to the uncertainty of the position of the centre of mass of the distribution of debris on the tray in relation to the axis of rotation of the same. Moreover the dimensions of the entire structure are considerable, having to take account of the surface of the tray that must have a width at least equal to the standard one of the vibrating screens, of the volume of rotation of the tray and finally of the volume occupied by the tray supports. In many working situations it is therefore necessary to waive the important supply of information arising from the systematic use of these devices due to a real lack of the space required for their positioning and operation.

The object of the present invention is therefore that of providing a device for the quantitative analysis of the debris produced during drilling of a well which is simple, reliable and with minimal bulk so as to adapt to the more severe and restrictive logistic conditions of operation.

Another object of the present invention is that of providing a device for the quantitative analysis of the debris that is able to measure directly the weight force of the debris, irrespective of its distribution on the appropriate collecting means.

A further object of the present invention is that of providing a device for the quantitative analysis of the debris that is able to perform an incremental measurement of the weight of the debris collected of the type $$\frac{\Delta P}{\Delta t},$$

the time increment or the weight increment being preselected by the user.

A last yet equally important object of the present invention is that of providing a device for the quantitative analysis of the debris equipped with means for the processing of the signal detected that is able to chart at least the data on the cumulative increase in the volume of debris in relation to time and in relation to depth, and information on the profile of the excavated well.

These and still other objects are achieved by the device according to the present invention for the quantitative analysis of debris, preferably produced during drilling, of the type equipped with means for the progressive collection of the debris, means for the progressive weighing of the debris collected, means for the periodical discharging of the same and a structure for support of the device, wherein said means for the collection of debris comprise a conveyor belt wound in the manner of a track on at least two rollers, said means for the weighing of debris comprise at least four sensing elements placed so as to take a direct measurement of the weight force exerted on the conveyor belt and said means for the discharging of the debris comprise at least one unit for actuation of the rollers.

Said means for weighing the debris preferably comprise four extensiometric cells installed near the corners of a base with a substantially rectangular plan, whereon said support structure is placed.

The working parameters set by the user will be the time of collection of the debris or the maximum limit of the weight of the debris collected, and the time of discharging of said debris.

Further advantageous features of the present invention will be made clearer on reading the following detailed description of a preferred embodiment, given by way of a non-limiting example whereto the accompanying drawings refer, in which.

Figure 1:
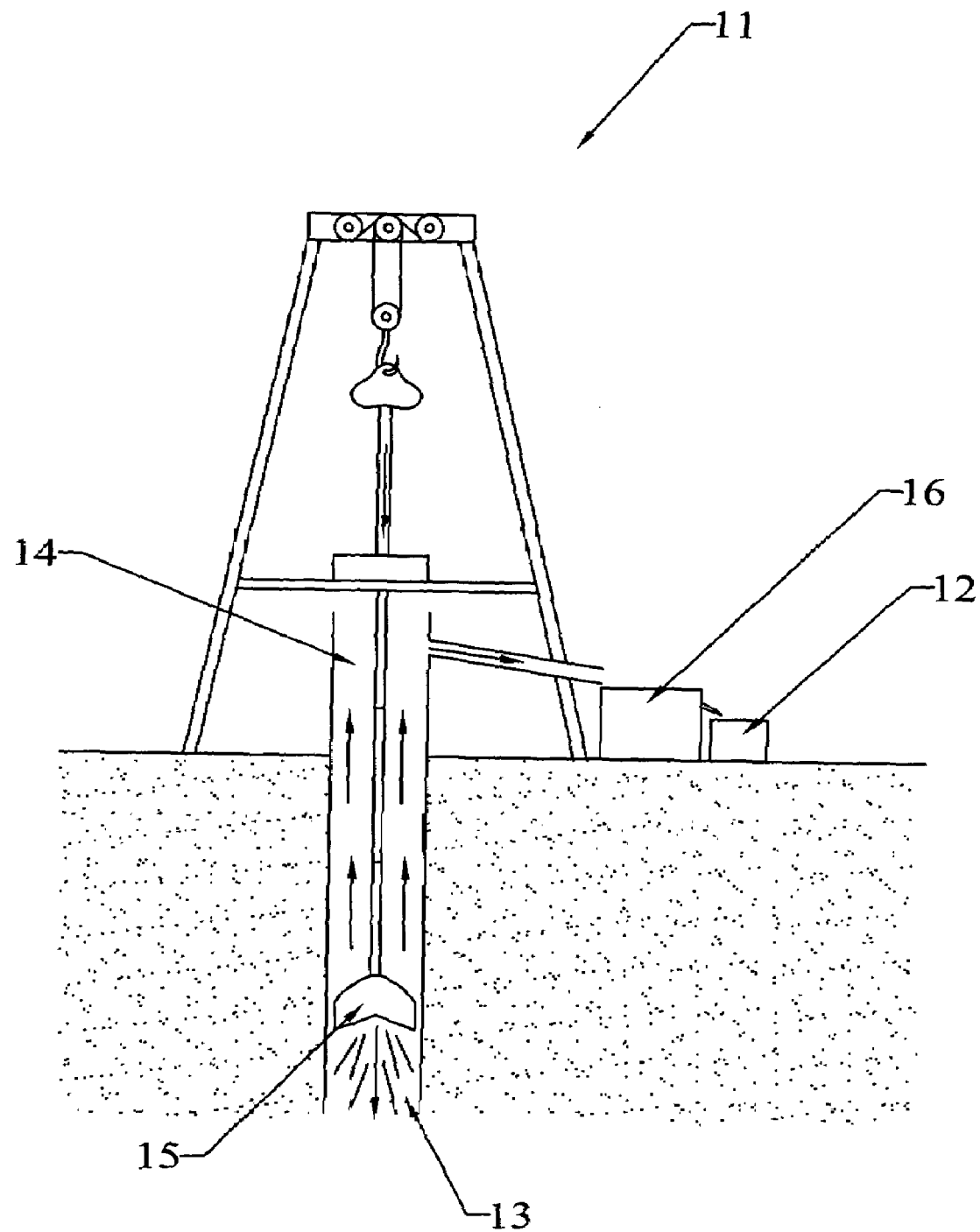
FIG. 1 shows schematically a drilling system, indicating the position of the device for the quantitative analysis of the debris according to the present invention.

FIG. 1 shows schematically a drilling system 11 wherein the positioning of the device for the quantitative analysis of debris 12 according to the present invention is shown. The jet of pressurised drilling fluid 13 follows the direction of the arrows in the drawing: it flows in the hollow interior of the drilling column 14 and exits violently from the tool 15, contributing to breaking up the rock. It therefore carries the debris to the surface, after having risen again in the annular space between the drilling column 14 and the walls of the well. Having reached the surface the drilling fluid 13 traverses the vibrating screens 16, generally consisting of a series of vibrating sieves and designed to separate the drilling fluid from the solid debris. The liquid is then collected in decantation tanks, not shown in the drawings, and then returned into circulation, while the debris is collected by the device 12 for quantitative analysis according to the present invention. A generic drilling tower can be provided with a plurality of such devices 12 for quantitative analysis, arranged operatively near the mouth of the well.

Figure 2:
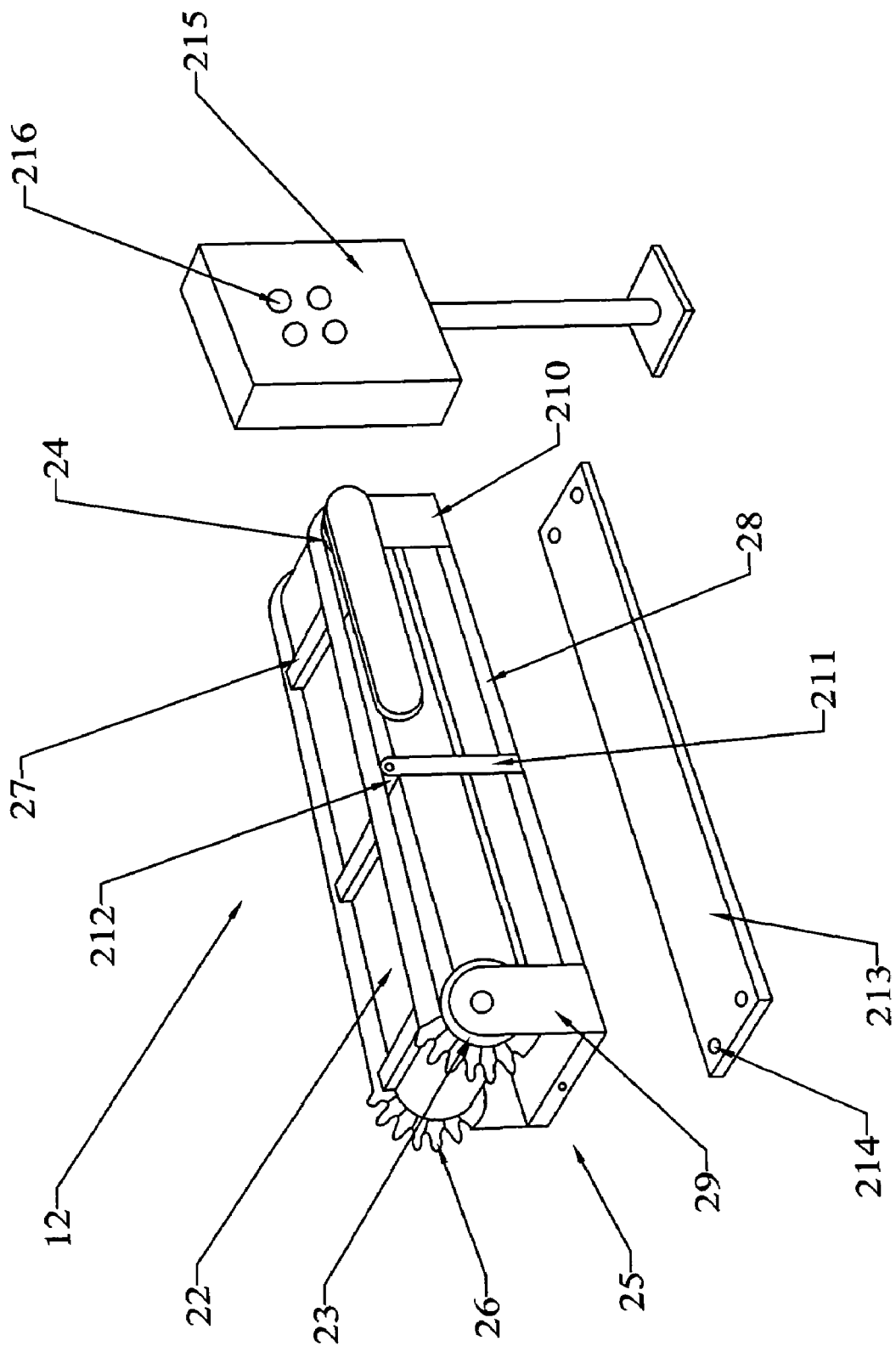
FIG. 2 is a schematic perspective view of the device for quantitative analysis of the debris.

FIG. 2 is a schematic perspective view of the device 12 for the quantitative analysis of debris. It comprises a conveyor belt 22 which is wound in the manner of a track on the driven roller 23 and on the driving roller 24, placed at opposite ends of the conveyor belt 22. Both rollers 23, 24 are hinged to the support structure 25 and are arranged in such a way that their axes of rotation are parallel one to the other and lie on the same horizontal plane. The conveyor belt 22 has a rectangular surface for the collection of debris, advantageously dimensioned in such a way that its length coincides substantially with the transverse dimensions of the discharge channel of the vibrating screens, from which the flow of debris exists continuously, while its width is such as to allow the accumulation of a quantity of debris suitable for obtaining interpretable weight measurements. The conveyor belt 22 is made in a resistant and elastic material, yet one which does not deteriorate as a result of the chemical attack produced by the substances dissolved in the residual drilling fluid and the abrasive action of the debris itself. The conveyor belt 22 is provided with transverse containment sidewalls 26 integral therewith and arranged on both sides along their entire length. Some transverse containment elements 27 are also present which, reciprocally and equidistantly spaced, allow more even distribution of the debris on the collection surface. The support structure 25 comprises the horizontal frame 28 provided with a substantially rectangular plan corresponding to the geometry of the conveyor belt 22, at whose opposite ends a first fork 29 and a second fork 210 are rigidly attached whereto the driven roller 23 and the driving roller 24 are hinged respectively. A third fork 211 is also attached to the horizontal frame 28 and whereto the support roller 212 is hinged, having the axis parallel to that of the rollers 22, 24. The support structure 25 also houses the unit for actuation of the driving roller 24, not shown in the drawing and which will be described herein below. The horizontal frame 210 of the support structure 25 is placed above the base 213, also provided with a substantially rectangular plan on which four extensiometric cells 214 are installed near the corners, one for each corner, in order to measure the progressive increment of the load transferred from the horizontal frame 210 to the base 213. The device 12 for the quantitative analysis of the debris is also equipped with a control panel 215, to be installed near the device itself, provided in a known manner and in accordance with standards with some manual controls 216. These controls comprise the selector of the automatic or manual operating modes, the pushbuttons for actuation and stop in said two operating modes and the emergency mushroom-head pushbutton for instantaneous disabling of the device 12 for quantitative analysis. The manual operating mode allows said device to be managed directly, while the automatic mode provides for the setting of the working parameters via a remote workstation, as we will see herein below.

Figure 3:
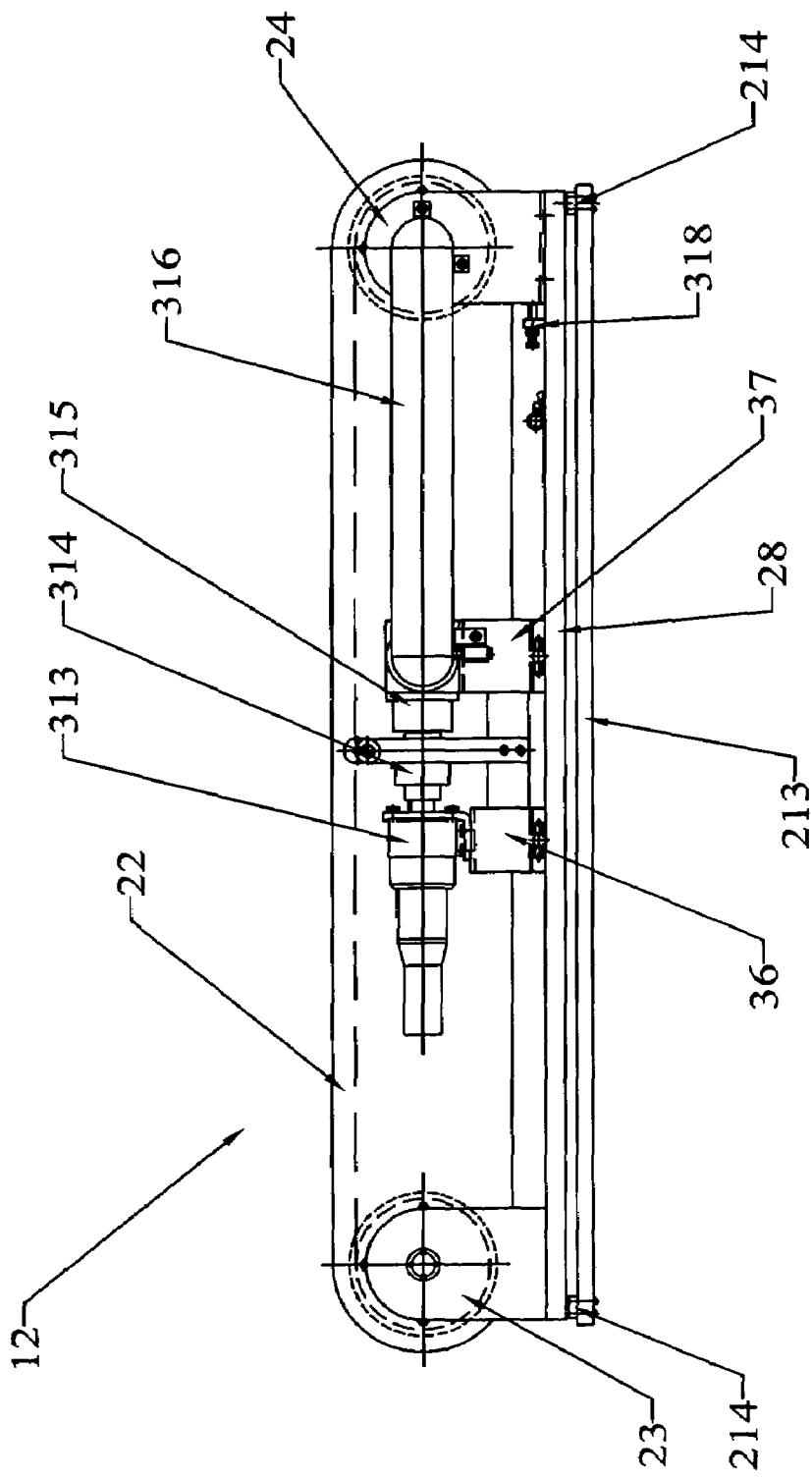
FIG. 3 is a side view of the device for the quantitative analysis of the debris of FIG. 2.

FIG. 3 shows a side view of the device 12 for the quantitative analysis of debris already described schematically with reference to FIG. 2, wherein the actuation unit that rotates the driving roller 24 is shown. This actuation unit comprises a pneumatic motor 313, a joint 314, an angular deviator 315 with right-angled bend and a transmission. Said transmission, made in a known manner by means of a pair of pinions and a chain, is screened by the protective casing 316. Advantageously the horizontal frame 28 is provided with transverse supports 36, 37 provided for the purpose with an overturned U-shaped profile whose horizontal base and whose vertical uprights are dimensioned in such a way as to allow sliding of the lower surface of the conveyor belt 22 through the space bordered by said same transverse supports and said horizontal frame 28. The motor 313 and the angular deviator 315 are restrained respectively to said bases of the transverse supports 36, 37 so that the actuation unit remains advantageously housed in the space between the upper and lower surfaces of the conveyor belt 22. On examining FIG. 3 the detail of the extensiometric cells 214, positioned between the horizontal frame 28 and the base 213 substantially at the axes of the rollers 23, 24 which are the support axes of the conveyor belt 22, can be seen. The device 12 for the quantitative analysis of debris according to the present invention is also equipped with a hydraulic circuit for feeding pressurised water, not shown in the drawings, which supplies the nozzles 318 for washing the conveyor belt, whose important function will be explained herein below.

The device 12 for the quantitative analysis of the debris produced during a drilling operation according to the present invention is designed to perform an incremental measurement of the weight of the debris collected of the type, the collection time increment or the maximum weight increment value preselected by the user accordingly. The vibrating screens, once the solid phase has been separated from the liquid phase of the material ejected from the mouth of the well, discharge this solid phase, i.e. the debris, directly onto the collection surface of the conveyor belt 22. Said conveyor belt, during the collection phase, lies immobile while the four extensiometric cells produce a voltage signal correlated to the weight of the debris that is progressively collected. Once this weight reaches the maximum limit set, that is to say a set period of time has elapsed, the discharge phase takes place. During this phase the pneumatic motor 313 is actuated automatically and rotates the conveyor belt 22 for a preset period of time. The collection surface, which previously coincided with the upper surface of the conveyor belt, slides progressively in the lower plane of the belt so as to discharge its contents laterally. Simultaneously the nozzles 28, which are placed on the horizontal frame 38, spray pressurised water onto the collection surface from the bottom upwards, cleaning it of any residues whose mass would otherwise continue to condition the weight signal during the subsequent collection phase. The discharging phase provides for a duration, in terms of time, such as to allow adequate washing of the collection surface of the belt. This time duration, which is selected by the operator, basically depends on the quality of the debris collected. The working parameters of the device for quantitative analysis of the debris 12 are selected by the user via a remote workstation which also receives the signal coming from the extensiometric cells. In a known manner the electronic brain is provided with dedicated programs for the collection and processing of the signals coming from the device 12 for the quantitative analysis of the debris, and these programs allow, among other things, display of the cumulative volume of debris versus time, the cumulative volume of debris versus the depth understood as the rectified linear coordinate and theoretical profile of the well excavated.

Figure 4:
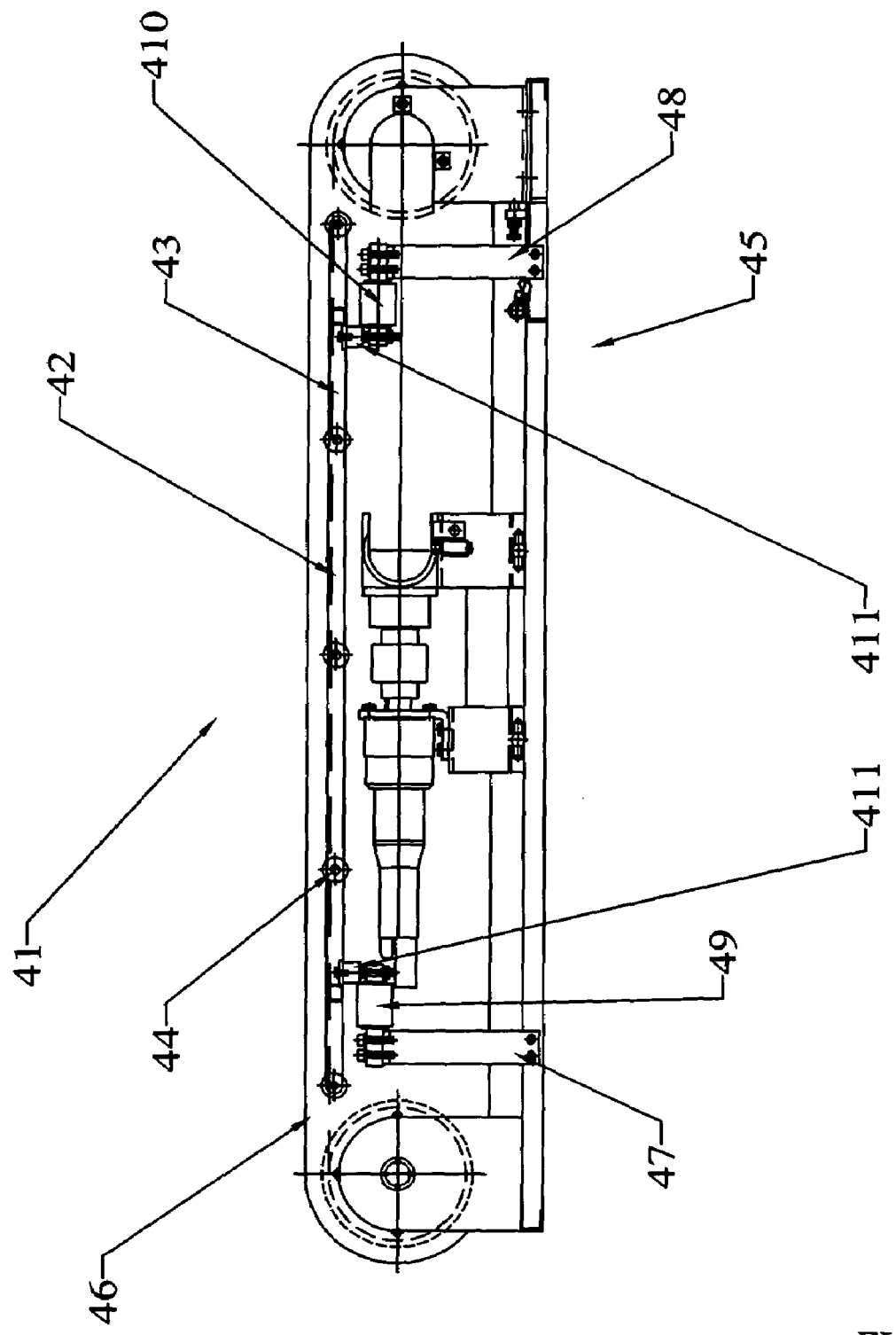
FIG. 4 is a side view of a second preferred embodiment of the device for quantitative analysis of debris.

FIG. 4 shows a side view of a second preferred embodiment of the device for the quantitative analysis of debris. Said device 41 for the quantitative analysis of debris also comprises a rigid surface 42 formed by a pair of lateral tracks 43 connected by various transverse rollers 44, free to rotate around their axis. This rigid surface 42 is restrained to the support structure 45 in a horizontal position directly below the collection surface of the conveyor belt 46. Two pairs of side uprights 47, 48, whereto a respective joining element 49, 410 is rigidly restrained, support the rigid surface 42. Four extensiometric cells 411 are installed in pairs between the rigid surface 42 and the joining elements 49, 410 in such a way that they can measure the progressive weight of the debris collected. This approach allows the preload value of the cells to be limited considerably, increasing in certain cases the sensitivity of the measurement. A further advantage of this embodiment is also that of allowing mere removal of the rigid surface 42 to perform maintenance or replace extensiometric cells, an operation that can be performed with extreme speed and ease and which does not entail movement of large weights.

It is clear that all the known elements described here and which make up the device for the quantitative analysis of debris according to the present invention can be replaced by technically equivalent elements, without the working principles of said device, as claimed herein below, being altered in any way. The materials with which the individual components are made are known to the state of the art and suitable or certified to operate in highly aggressive site conditions. The variations in the materials of the components must therefore be compatible with the technical requirements of the same, so that these variations do not alter in any way what is described and claimed hereinunder.

The invention claimed is:

1. A device for the quantitative analysis of debris (12) produced during a drilling operation, equipped with means for the progressive collection of debris, means for the progressive weighing of the debris collected, means for the discharging of same and a structure for support of the device, said means for the collection of the debris comprising a conveyor belt (22) wound in the manner of track on at least two rollers (23, 24), said support structure comprising a horizontal frame (28) and a substantially rectangular base (213) whereon said horizontal frame (28) is placed, characterise in that said means for the weighing of the debris comprise at least four sensing elements 214) positioned between said horizontal frame (28) and said base (213) in such a way to take a direct measurement of the weight force exerted on the conveyor belt (22), said device is provided with an hydraulic circuit for feeding pressurised water which supplies the nozzles (318) for washing said conveyor belt, removing the residues eventually attached on it that would otherwise affect the measured weight, and that said means for discharging the debris comprise at least one unit for actuation of the rollers.

2. A device for the quantitative analysis of debris according to claim 1, wherein said at least two rollers (23, 24) are hinged to the support structure (25, 45) and are arranged in such a way that their axes of rotation are parallel one to the other and lie on the same horizontal plane.

3. A device for the quantitative analysis of debris according to claim 1, wherein at opposite ends of said support structure (25) at least a first fork (29) and a second fork (210) are attached rigidly and whereto the at least two rollers (23, 24) are hinged, respectively.

4. A device for the quantitative analysis of debris according to claim 1, wherein said conveyor (22, 46) belt is provided with containment sidewalls (26), integral thereto and placed on both sides along their whole length, and defines an upper or debris collection surface and a lower surface.

5. A device for the quantitative analysis of debris according to claim 4, wherein some reciprocally and equidistantly spaced transverse containment elements (27) are also present.

6. A device for the quantitative analysis of debris according to claim 1, wherein said actuation unit remains housed in the space between upper and lower surfaces of the conveyor belt (22,46).

7. A device for the quantitative analysis of debris according to claim 1, wherein the actuation unit comprises a pneumatic motor (313), a joint (314), an angular deviator (315) with right-angled bend and a transmission.

8. A device for the quantitative analysis of debris according to claim 7, wherein the horizontal frame (28) is equipped with transverse supports (36, 37) provided for the purpose with an overturned L-shaped profile, whose horizontal base and whose vertical uprights are dimensioned so as to allow sliding of the lower surface of the conveyor belt through the space bordered by said same transverse supports and said horizontal frame (28).

9. A device for the quantitative analysis of debris according to claim 8, wherein the motor (313) and angular deviator (315) are restrained respectively to said bases of the transverse supports (36, 37).

10. A device for the quantitative analysis of debris according to claim 1, wherein said nozzles (318) for the washing of the conveyor belt are placed on the horizontal frame (28).

11. A device for the quantitative analysis of debris according to claim 7, wherein said transmission of the actuation unit is formed by means of a pair of pinions and a chain and is screened by the protective casing (316).

12. A device for the quantitative analysis of debris according to claim 1, wherein the device for the quantitative analysis of debris (12, 41) is equipped with a control panel (215) provided with manual controls (216), including the selector of the automatic or manual operating modes, the pushbuttons for actuation and stop in said two operating modes and the emergency mushroom-head pushbutton for instantaneous disabling of the device for quantitative analysis (12, 41).

13. A device for the quantitative analysis of debris according to claim 1, characterised in that working parameters set by the user are the time of collection of the debris or the maximum limit of weight of the debris collected and the time of discharging of said debris.

14. A device for the quantitative analysis of debris according to claim 1, wherein said conveyor belt (22, 46), during the phase of collection of the debris, lies immobile while the four extensiometric cells (214, 411) produce a signal correlated to the weight of the debris that is progressively collected.

15. A device for the quantitative analysis of debris according to claim 1, wherein said actuation unit, during the phase of discharging of the debris, rotates the conveyor belt (22, 46) and the collection surface, which previously coincided with the upper surface of the conveyor belt (22, 46) and slides progressively in the lower plane of the belt (22, 46) so as to discharge its contents laterally.

16. A device for the quantitative analysis of debris according to claim 1, wherein said nozzles (318), in the phase of discharging of the debris, spray pressurised water onto the collection surface, cleaning possible residues from it.

17. A device for the quantitative analysis of debris according to claim 13, wherein said working parameters of the device for the quantitative analysis of debris (12, 41) can be selected by the user via a remote workstation.

18. A device for the quantitative analysis of debris according to claim 14, wherein the signal coming from the extensiometric cells (214, 411) can be sent for processing to a remote workstation.

19. A device for the quantitative analysis of debris according to claim 2, wherein at opposite ends of said support structure (25) at least a first fork (29) and a second fork (210) are attached rigidly and whereto the at least two rollers (23, 24) are hinged, respectively.

20. A device for the quantitative analysis of debris according to claim 2, wherein said conveyor (22, 46) belt is provided with containment sidewalls (26), integral thereto and placed on both sides along their whole length, and defines an upper or debris collection surface and a lower surface.

* * * * *